United States Patent [19]

Wiebe

[11] 4,398,369

[45] Aug. 16, 1983

[54] FISHING ROD COMBINATION HAVING IMPROVED SENSITIVITY

[76] Inventor: Kenneth R. Wiebe, 431 Kensington Way, Lodi, Calif. 95240

[21] Appl. No.: 234,845

[22] Filed: Feb. 17, 1981

[51] Int. Cl.³ ............................................. A01K 87/00
[52] U.S. Cl. .......................................... 43/18.1; 43/23
[58] Field of Search ................ 43/18 R, 18 CF, 21.2, 43/23

[56] References Cited

U.S. PATENT DOCUMENTS

| | | | |
|---|---|---|---|
| 2,252,054 | 8/1941 | Welch | 43/23 |
| 2,597,738 | 5/1952 | Koos | 43/18 R |
| 2,711,047 | 6/1955 | Shepherd | 43/23 |
| 4,061,806 | 12/1977 | Lindler et al. | 43/18 R |

OTHER PUBLICATIONS

C. Boyd Pfeiffer, . . . Graphite Rods Apparently Here to Stay, Jan. 16, 1976, D6 of Washington Post.

*Primary Examiner*—Nicholas P. Godici
*Assistant Examiner*—M. Jordan
*Attorney, Agent, or Firm*—Christensen, O'Connor, Johnson & Kindness

[57] ABSTRACT

A fishing rod combination with a finger grip for improved communication of rod flexing due to line action to a user. The finger grip includes a body portion with a centrally disposed opening or bore for intimately receiving the rod. The finger grip is preferably graphite when used with a graphite rod, and an essentially integral structure is provided by bonding the body portion to the rod with a mixture of epoxy glue and graphite particles.

3 Claims, 5 Drawing Figures

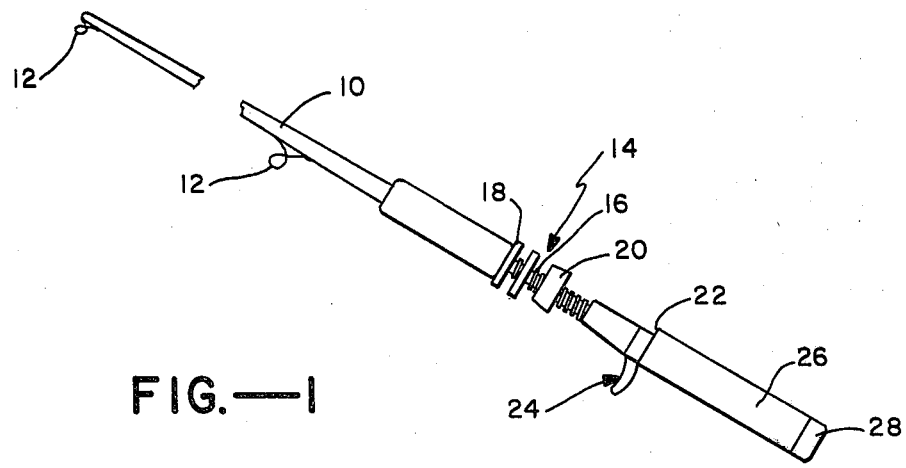
FIG.—1
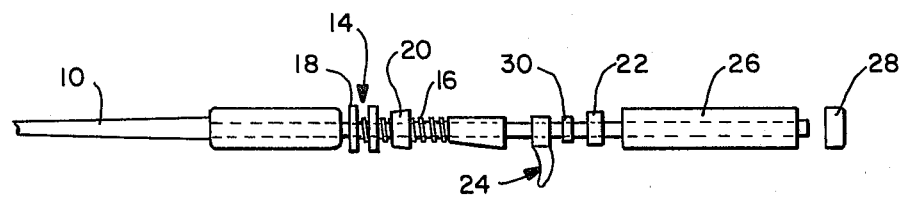
FIG.—2
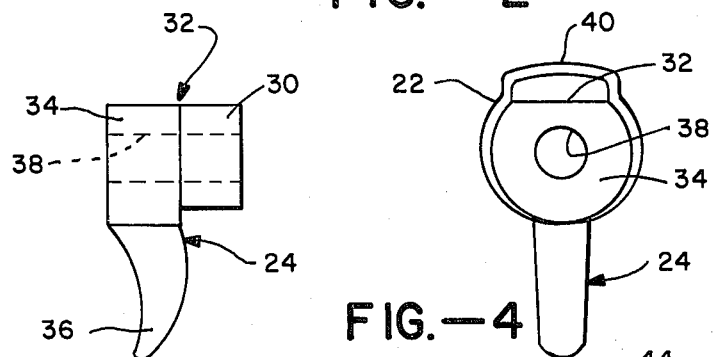
FIG.—3
FIG.—4
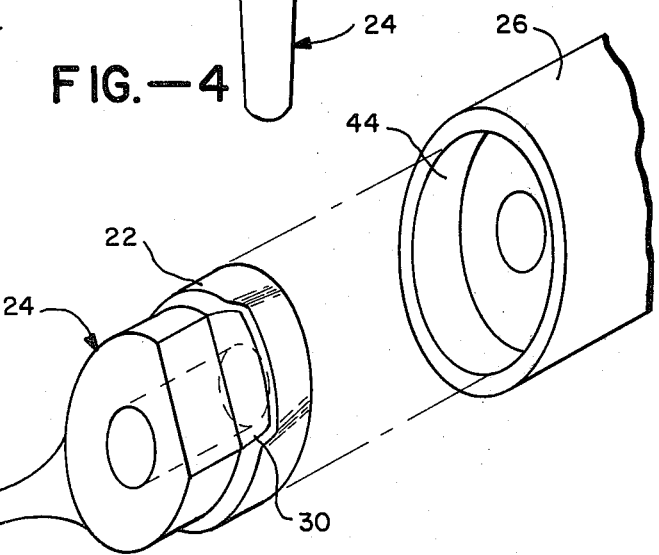
FIG.—5

FISHING ROD COMBINATION HAVING IMPROVED SENSITIVITY

This invention relates generally to fishing apparatus, and more particularly the invention relates to a fishing rod combination which provides improved sensitivity to the pull on a fishing line.

Fishing rods typically include a handle and a finger grip to facilitate casting and reeling. Normally, the finger grip is attached to the circumference of the handle as shown in U.S. Pat. No. 2,482,192 to MacDonald or is integral with the handle as shown in U.S. Pat. No. 2,597,738 to Koos. Such finger grips are relatively insensitive to flexing of the rod caused by pull on fishing lines. Such insensitivity to the rod flexing is particularly acute with graphite rods which readily respond to action on the line.

Accordingly, an object of the present invention is a fishing rod combination which has improved sensitivity to line action.

Another object of the invention is a fishing rod combination which communicates the flexing of a rod to the user of a fishing rod.

A feature of the invention is a finger grip member for cooperative positioning with a handle and having a body with a centrally disposed opening for intimately receiving a rod member and a grip portion extending around the body portion and shaped to receive a finger.

Briefly, in accordance with the invention, the fishing rod combination comprises an elongated rod, a handle portion affixed to one end of the rod, a reel seat assembly adjacent to the handle portion for accommodating a reel, and a finger grip member cooperatively positioned with the handle portion for manually gripping the rod.

In a preferred embodiment one end of the handle portion includes a recessed portion, and the combination further includes an annular hood member having a bulge portion for supportively receiving a reel tong and an annular bushing positioned within the hood member and having a centrally disposed opening for receiving the elongated rod. The hood member and bushing are received in the recessed portion of the handle between the handle portion and the finger grip member. The annular or hood member cooperates with the reel seat assembly supporting a reel.

In a preferred embodiment the elongated rod extends through the handle portion and the combination further includes a butt cap attached to the end of the elongated rod at the end of the handle portion opposite to the recessed portion.

The finger grip portion in accordance with the invention is particularly useful with a graphite rod. In such application the finger grip member preferrably comprises graphite, and the graphite rod is affixed to the finger grip member by a mixture of epoxy glue and graphite powder particles.

The invention and objects and features thereof will be more readily apparent from the following detailed description and appended claims when taken with the drawing, in which:

FIG. 1 is a perspective view of a fishing rod combination in accordance with one embodiment of the invention;

FIG. 2 is an exploded plan view of the fishing rod combination of FIG. 1;

FIG. 3 is a side view of a finger grip member and bushing of the rod combination with FIGS. 1 and 2;

FIG. 4 is an end view of the finger grip member and an annular hood member in the rod combination of FIGS. 1 and 2;

FIG. 5 is an exploded perspective view illustrating the cooperative relationship of the finger grip portion and the annular hood member with the handle portion of the fishing rod combination of FIGS. 1 and 2.

Referring now to the drawing, FIG. 1 is a perspective view of one embodiment of a fishing rod combination in accordance with the invention. The combination includes an elongated rod 10 having a plurality of eyelets 12 for receiving a fishing line. A reel seat assembly is shown generally at 14 and includes a threaded body portion 16 and a nut 18 for positioning a hood member 20. A second, stationary hood member 22 cooperates with the movable hood member 20 in gripping the tongs of a reel for mounting of the reel on the hood assembly. A finger grip member 24 cooperates with a handle portion 26 to facilitate casting and reeling.

FIG. 2 is an exploded plan view of the rod combination of FIG. 1, and in this embodiment the rod 10 extends axially through the reel seat assembly 14, the finger grip member 24, the annular hood member 22, and the handle portion 26. The end of rod 10 which extends from the handle portion 26 mates with a butt cap 28 for retaining the handle portion on the rod 10. Disposed within the annular hood member 22 in abutment with the finger grip member 24 is an annular bushing 30 which facilitates the positioning of a reel tong in the hood member 22, as will be described further hereinbelow with reference to FIGS. 3 and 4.

FIG. 3 is a side view of the finger grip member 24 and the bushing 30 in abutment therewith. The finger grip member 24 includes a body portion 34 and an integral grip portion 36 which is shaped to accommodate a finger. A central opening or bore 38 extends through the body portion 34 and bushing 30 for intimately receiving and engaging the rod. The top surfaces of the finger grip member and bushing 30 shown generally at 32 are flattened to facilitate receipt of a reel tong.

FIG. 4 is an end view of the finger grip portion 24 and bushing positioned in the annular hood member 22. The hood member 22 includes a bulge portion 34 which cooperates with the flattened surface 32 for receipt of the reel tong. Referring to FIG. 5 one end of the handle 26 includes a recessed portion 44 for receiving the hood member 22.

By providing the finger grip member 24 in intimate contact with the rod 10 the flexing of the rod due to action on the fishing line is more readily communicated to the finger of the user. The finger grip member is particularly useful with a graphite rod which readily responds to action on the line. When used with a graphite rod the finger grip member preferably comprises graphite, and an essentially integral structure is provided by affixing the finger grip member to the graphite rod with a mixture of epoxy glue and graphite powder particles.

A fishing rod combination as described has proved to offer improved sensitivity to line action by more readily communicating flexing of a rod to the user of the fishing rod. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

I claim:

1. A fishing rod combination, comprising;
an elongated rod,
a handle portion affixed to one end of said rod,
a reel seat assembly spaced forwardly of said handle portion for accommodating a reel,
a finger grip member spaced forwardly of said handle portion, said finger grip member being structurally separate from said handle and said reel seat assembly and including a body portion having a centrally disposed opening for intimately receiving and directly engaging said elongated rod, and means for securely attaching said finger grip member directly to said rod to facilitate communication of the flexing of said rod to said finger grip member; and
wherein the end of said handle disposed toward said finger grip member includes a recessed portion, and further including an annular hood member disposed within said handle recessed portion in close abutment with said finger grip member and having a bulge portion and an annular bushing positionable within said hood member and having a centrally disposed opening for snugly receiving said elongated rod, said annular hood member co-operating with the outer surface of said annular bushing for supportively receiving a reel tong therebetween.

2. A fishing rod combination best defined by claim 1, wherein said rod comprises graphite and said finger grip member comprises graphite.

3. A fishing rod combination best defined by claim 2, wherein said rod is affixed to said finger grip member by a mixture of epoxy glue and graphite powder particles.

* * * * *